United States Patent
Griffiths et al.

(10) Patent No.: US 11,097,219 B2
(45) Date of Patent: Aug. 24, 2021

(54) THERMAL SWING ADSORPTION PROCESS WITH PURIFICATION

(71) Applicant: UOP LLC, Des Plaines, IL (US)

(72) Inventors: John Louis Griffiths, Arlington Heighls, IL (US); Shain-Jer Doong, Kildeer, IL (US); James Robert Gaspar, Roselle, IL (US); Jayant Kumar Gorawara, Buffalo Grove, IL (US)

(73) Assignee: UOP LLC, Des Plaines, IL (US)

( * ) Notice: Subject to any disclaimer, the term of this patent is extended or adjusted under 35 U.S.C. 154(b) by 241 days.

(21) Appl. No.: 16/365,618

(22) Filed: Mar. 26, 2019

(65) Prior Publication Data

US 2019/0299155 A1    Oct. 3, 2019

Related U.S. Application Data

(60) Provisional application No. 62/651,119, filed on Mar. 31, 2018.

(51) Int. Cl.
*B01D 53/00* (2006.01)
*B01D 53/04* (2006.01)
*B01D 53/26* (2006.01)

(52) U.S. Cl.
CPC ....... *B01D 53/0462* (2013.01); *B01D 53/261* (2013.01); *B01D 2257/80* (2013.01)

(58) Field of Classification Search
CPC .......... C07C 7/13; C07C 11/04; C07C 7/005; C07C 7/12; B01D 2253/108; B01D 2253/116; B01D 2253/204; B01D 2256/24; B01D 2257/7022; B01D 53/0462; B01D 2253/102; B01D 2259/40043; B01D 53/0407
See application file for complete search history.

(56) References Cited

U.S. PATENT DOCUMENTS 4,971,606 A * 11/1990 Sircar ................ B01D 53/0462
                                                  95/124
5,012,037 A   4/1991 Doshi et al.
(Continued)

OTHER PUBLICATIONS

Ambrozek et al.,Theoretical and experimental studies of the recovery of volatile organic compounds from waste air streams in the thermal swing adsorption system with closed-loop regeneration of adsorbent, Energy Conservation Management, 2014, vol. 85, pp. 646-654, Elsevier.
(Continued)

*Primary Examiner* — Sharon Pregler
(74) *Attorney, Agent, or Firm* — Paschall & Associates, LLC; Mark Goldberg

(57) ABSTRACT

A process for regenerating a temperature swing adsorption unit comprising:
sending a heated purge gas stream through an adsorption bed to remove impurities from said adsorption bed and producing a contaminated stream; sending said contaminated stream to a separator to produce a liquid stream and a vapor stream; returning said vapor stream as at least a portion of said heated purge stream until said vapor stream comprises above a predetermined level of impurities; and purging a portion of said vapor stream until the heated purge stream has a level of impurities below a second predetermined level.

9 Claims, 10 Drawing Sheets

(56) References Cited

U.S. PATENT DOCUMENTS

| | | | |
|---|---|---|---|
| 5,089,034 | A | 2/1992 | Markovs et al. |
| 5,094,755 | A | 3/1992 | Knaebel |
| 8,778,050 | B2 | 7/2014 | Dolan et al. |
| 8,815,083 | B2 | 8/2014 | Watson |
| 8,936,669 | B2 | 1/2015 | Doong et al. |
| 9,126,878 | B1 | 9/2015 | Ji et al. |
| 9,505,683 | B2 | 11/2016 | Doong et al. |
| 9,517,983 | B2 | 12/2016 | Dolan |
| 2005/0229784 | A1* | 10/2005 | Thomas .................... C10L 3/10 95/188 |
| 2008/0282606 | A1 | 11/2008 | Plaza et al. |
| 2013/0149210 | A1 | 6/2013 | Gudde et al. |
| 2016/0228809 | A1 | 8/2016 | Meirav et al. |
| 2018/0085705 | A1* | 3/2018 | Barnes ............... B01D 53/0462 |

OTHER PUBLICATIONS

Mulloth et al., Performance Characterization of a Temperature-Swing Adsorption Compressor for Closed-Loop Air Revitalization Based on Integrated Tests with Carbon Dioxide Removal and Reduction Assemblies, SAE International, 36th International Conference on Environmental Systems (ICES), Jul. 17-20, 2006, Norfolk, Virginia.

International Search Report and Written Opinion in corresponding PCT application PCT/US2019/024791 dated Aug. 22, 2019.

\* cited by examiner

THERMAL SWING ADSORPTION PROCESS WITH PURIFICATION

This application claims priority from U.S. application 62/651,119, filed Mar. 31, 2019 which is incorporated herein in its entirety.

BACKGROUND OF THE INVENTION

The present invention relates to a temperature swing adsorption process for the removal of an impurities, such as an acid gas, from a gas mixture, such as a natural gas stream. More specifically, the present invention relates to a temperature swing adsorption process that enables high purity levels at reduced capital costs and costs of operation including minimizing the loss of hydrocarbons to downstream processes and conservation of hydrogen.

A liquid temperature adsorption process which is integrated with a refinery may take advantage of the pressure swing adsorption (PSA) hydrogen which is available for use as the regeneration gas, especially as it tends to be low in impurities. However, the liquid hydrocarbon which is present in the macropores of the adsorbent will tend to be carried in the waste PSA hydrogen into downstream processes causing operational issues. Therefore, an issue is to use as much of the PSA hydrogen as possible and minimize the amount of liquid hydrocarbon carried over into the downstream processes.

Gas separation is important in many industries and can typically be accomplished by flowing a mixture of gases over an adsorbent that preferentially adsorbs a more readily adsorbed component relative to a less readily adsorbed component of the mixture. One of the more important types of gas separation technology is swing adsorption, such as pressure swing adsorption (PSA) or temperature swing adsorption (TSA). PSA processes rely on the fact that when gases are under pressure they tend to be adsorbed within the pore structure of the microporous adsorbent materials or within the free volume of a polymeric material. When the pressure of the adsorbent is decreased, the adsorbed gas is released, or desorbed. By cyclically swinging the pressure of adsorbent beds between high pressures to adsorb and lower pressures to desorb, PSA processes can be used to separate gases in a mixture when used with an adsorbent that is selective for one or more of the components in a gas mixture that are to be removed.

TSA processes also rely on the fact that at cold temperatures gases tend to be adsorbed within the pore structure of the microporous adsorbent materials or within the free volume of a polymeric material. When the temperature of the adsorbent is increased, the adsorbed gas is released, or desorbed. By cyclically swinging the temperature of adsorbent beds between low temperatures to adsorb and higher temperatures to desorb, TSA processes can be used to separate gases in a mixture when used with an adsorbent that is selective for one or more of the components in a gas mixture that are to be removed.

DETAILED DESCRIPTION OF THE INVENTION

When operating a thermal swing adsorption unit, the adsorption bed generally goes through six distinct phases:

Offline Preparation: In a liquid TSA process the bed is first drained of the process liquid. In a gas TSA process the bed may be purged or pressure equalized.

Heating of the bed: During this stage, hot purge gas is passed into the bed and the temperature of the adsorbent rises. Typically, in treatment of natural gas, the entry temperature of the purge gas may be about 600° F. (315° C.) while the outlet temperature is over 100° F. less than the inlet temperature of the hot purge gas. During this stage a large fraction of the contaminants is removed from the adsorbent.

Thermal soak: Hot purge gas at about 600° F. (315° C.) continues to be fed to the bed. The exit temperature of the purge gas is less than 100° F. cooler than the inlet temperature of the hot purge gas. During this stage, the remaining contaminants are removed from the bed.

Cooling: Cool purge gas is fed to the bed (typically 80-100° F. (26 to 38° C.)), at a temperature close to ambient, and the adsorbent bed is cooled. During this stage the temperature of the purge gas leaving the bed falls from about 600° F. (315° C.) to less than about 200° F. (93° C.).

Online Preparation: In a liquid TSA arrangement, the bed is now filled with the process liquid in preparation for being brought online and in a gas TSA arrangement, the bed may be purged or pressure equalized.

Operation: Contaminated process fluid is fed to the bed and the clean process fluid is removed. The contaminants are adsorbed.

The problem with prior art processes is that to achieve a high purity of the clean process fluid, it is necessary to ensure that the contaminants have been removed from the bed to a sufficient level during the regeneration phase (during steps 2-4 above with the heating of the bed, thermal soak, and subsequent cooling). To achieve a successful regeneration of the adsorbent bed, it has generally been recommended that high purity gas be used for the regeneration step (with only low levels of the contaminants which need to be removed).

Figure 2:
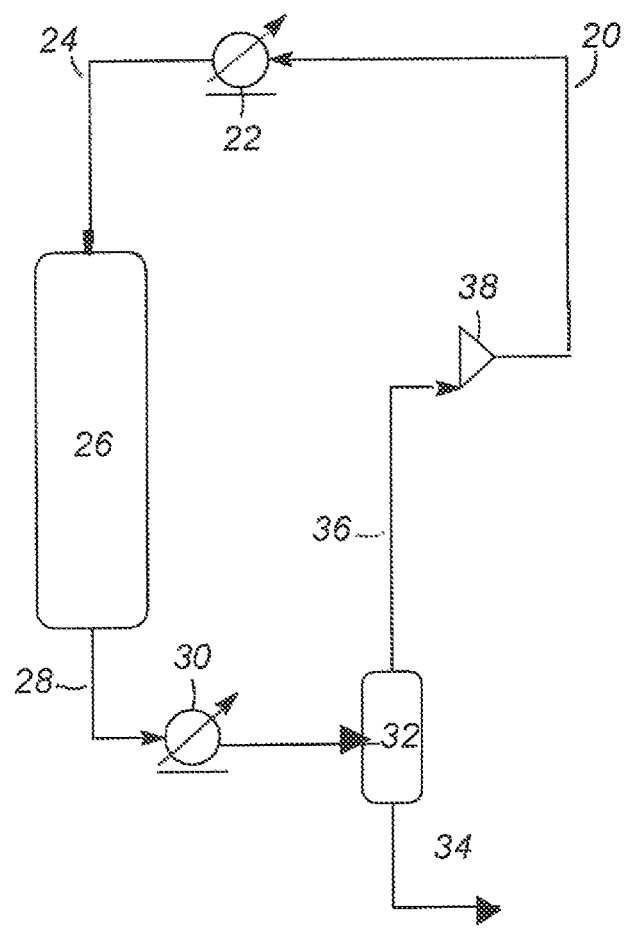
FIG. 2 shows a closed loop configuration for regenerating an adsorbent bed.

However, many operations have neither a source of purge gas meeting the purity levels nor a secondary operation which can utilize this waste purge gas. Therefore, the operators of many TSA processes generally prefer to use a closed loop regeneration system (FIG. 2). In a closed loop system, the operation may be similar to the open loop regeneration cycle, even though the fresh purge gas is drawn from the waste purge gas. For many operations, this is a suitable approach. However, there are a large number of processes where the purity levels of the waste purge gas are insufficient to enable the required purity of the clean process fluid to be achieved.

There are many ways to enable the waste purge gas to meet the purity specifications. The most common modification is to run the chiller at colder temperatures. This reduces the vapor pressure of the contaminants and a larger amount of the contaminants can be removed in the separator. If temperatures below 80° F. (27° C.) are required, this will typically necessitate the inclusion of a chiller loop, adding capital cost (CAPEX) and operating costs (OPEX). A typical arrangement for this type of solution can be found in U.S. Pat. No. 8,936,669 where in order to achieve the purity levels necessary, the chiller needed to operate at temperatures around 50° F. (10° C.)

Another solution is to use a two-step process in order to achieve the necessary purity levels. A chiller/separator operating at or near ambient conditions is then coupled to a second device which further removes contaminants from the waste purge gas. These devices can be one of multiple options including chemisorbant guard beds, another physisorbant, lean oil wash, fractionation, and catalytic destruction. U.S. Pat. No. 4,971,606 is an example of a situation where a reactive component needs to be removed and through the use of a second adsorption step, the waste purge gas can achieve the necessary purity. It is clear that this approach can be used to remove many different contaminants and it has been utilized frequently to achieve the specifications needed to run a close loop TSA system where the waste purge gas purity cannot be achieved by a simple cooler/separator arrangement.

The problem that is created in these solutions is that the solution used to remove the impurities not only leads to a major increase in the capital cost, but also operating costs. Unfortunately, in trying to solve the main problem of meeting the purity specification for the purge gas they have added unnecessary cost increases.

Figure 1:
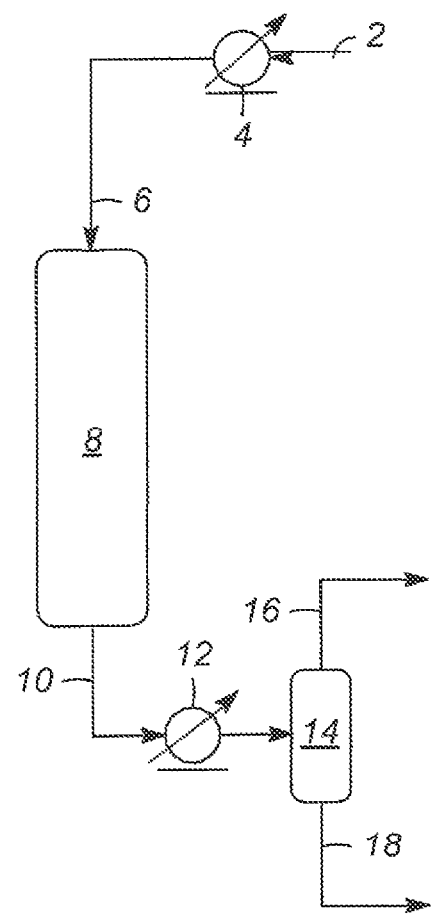
FIG. 1 shows an open loop configuration for regenerating an adsorbent bed.

FIG. 1 shows a prior art open loop configuration to regenerate adsorbent bed 8 with purge gas 2 which is first heated by heater 4 with heated purge gas 6 entering adsorbent bed 8. A gas stream 10 containing impurities is first cooled by cooler 12 and then is sent to separator 14 to produce a waste purge gas stream 16 and a liquid stream 18.

FIG. 2 shows a closed loop configuration in which a treated purge stream 20 is heated by heater 22 with heated purge stream 24 entering adsorbent bed 26 to remove contaminants that are being desorbed. A stream 28 containing removed contaminants is cooled by cooler 30 and then enters separator 32 to be separated into liquid stream 34 and vapor stream 36 that is compressed to become treated purge stream 20.

Figure 3:
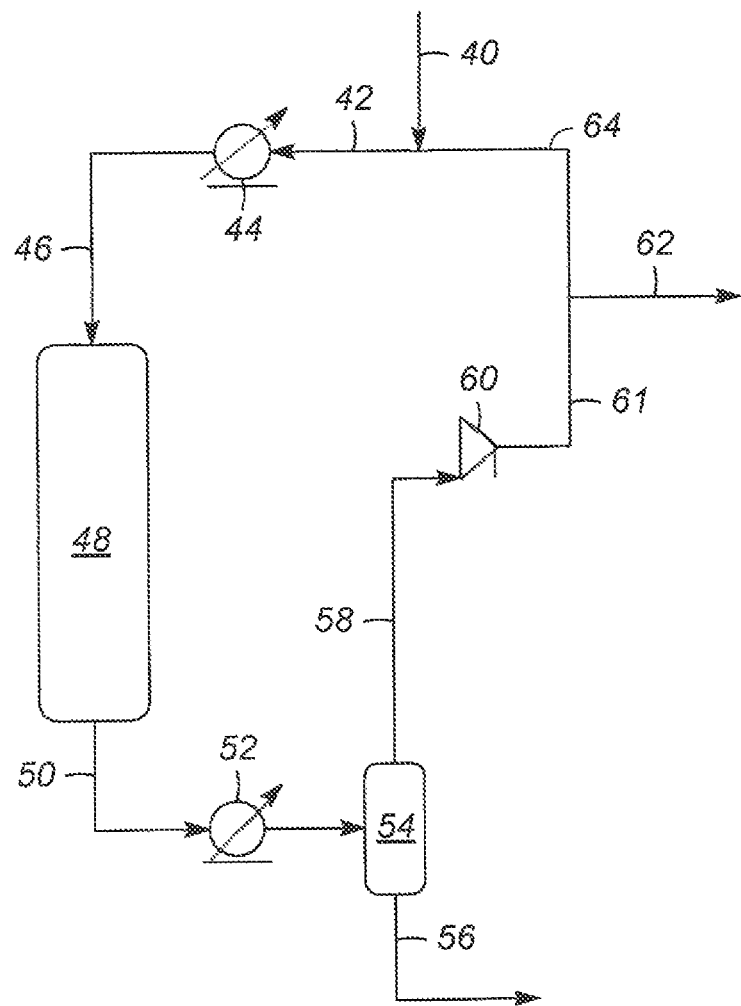
FIG. 3 shows a semi-closed loop configuration for regenerating an adsorbent bed.

An alternative system for regenerating an adsorbent bed is shown in FIG. 3 which shows a semi-closed loop system. A feed 40 is shown as stream 42 passing through heater 44 to produce heated stream 46 that enters adsorbent bed 48. A contaminated stream 50 containing the impurities removed from adsorbent bed 50 is cooled by cooler 52 and sent to separator 54 with impurities sent into liquid stream 56 and vapor stream 58 is compressed by compressor 60 with compressed stream 61 sent to line 64 and combined with feed 40. A portion of compressed stream 61 is shown being removed into purge stream 62.

Figure 4:
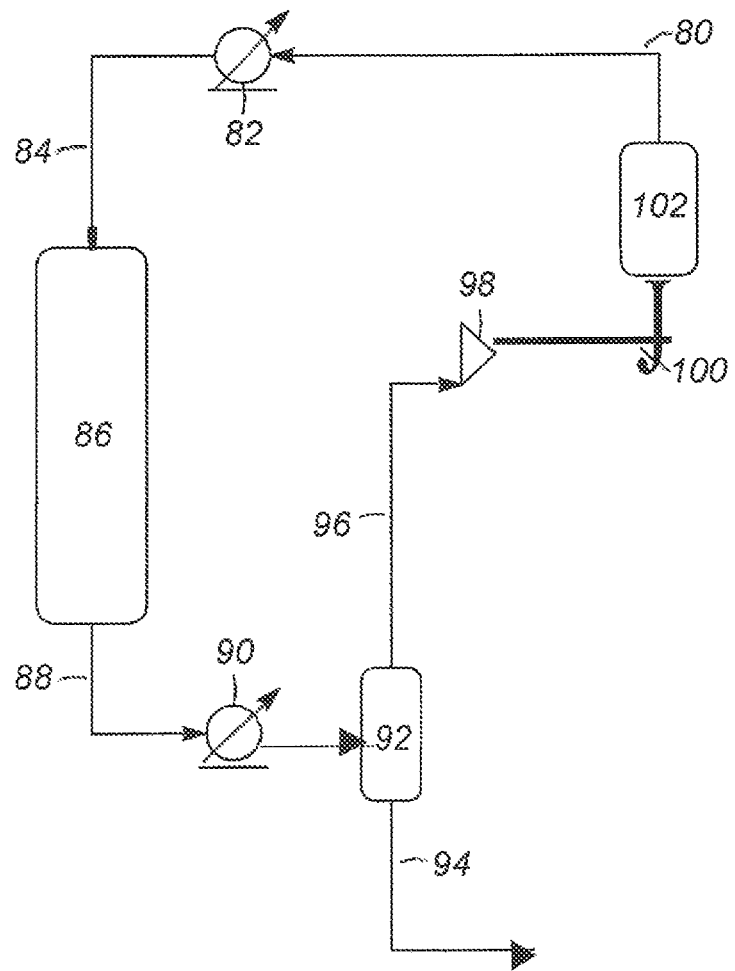
FIG. 4 shows a purifying step in a regeneration configuration.

Under certain operating conditions it is desired to have additional treating of the vapor stream that is being used to desorb the impurities from the adsorbent in the adsorbent bed. FIG. 4 shows such a system with a purge gas stream 80 that is heated by heater 82 with heated gas stream 84 passing through adsorbent bed 86. A contaminated gas stream 88 that contains the impurities removed from adsorbent bed 86 is cooled by cooler 90 and then separated in separator 92 into liquid stream 94 and vapor stream 96. Vapor stream is compressed by compressor 98 with compressed stream 100 sent through purifier 102 to result in purge gas stream 80. FIGS. 5, 6, 7 and 9 show several embodiments of the invention with scrubbing elements used to remove impurities from the purge stream.

Figure 5:
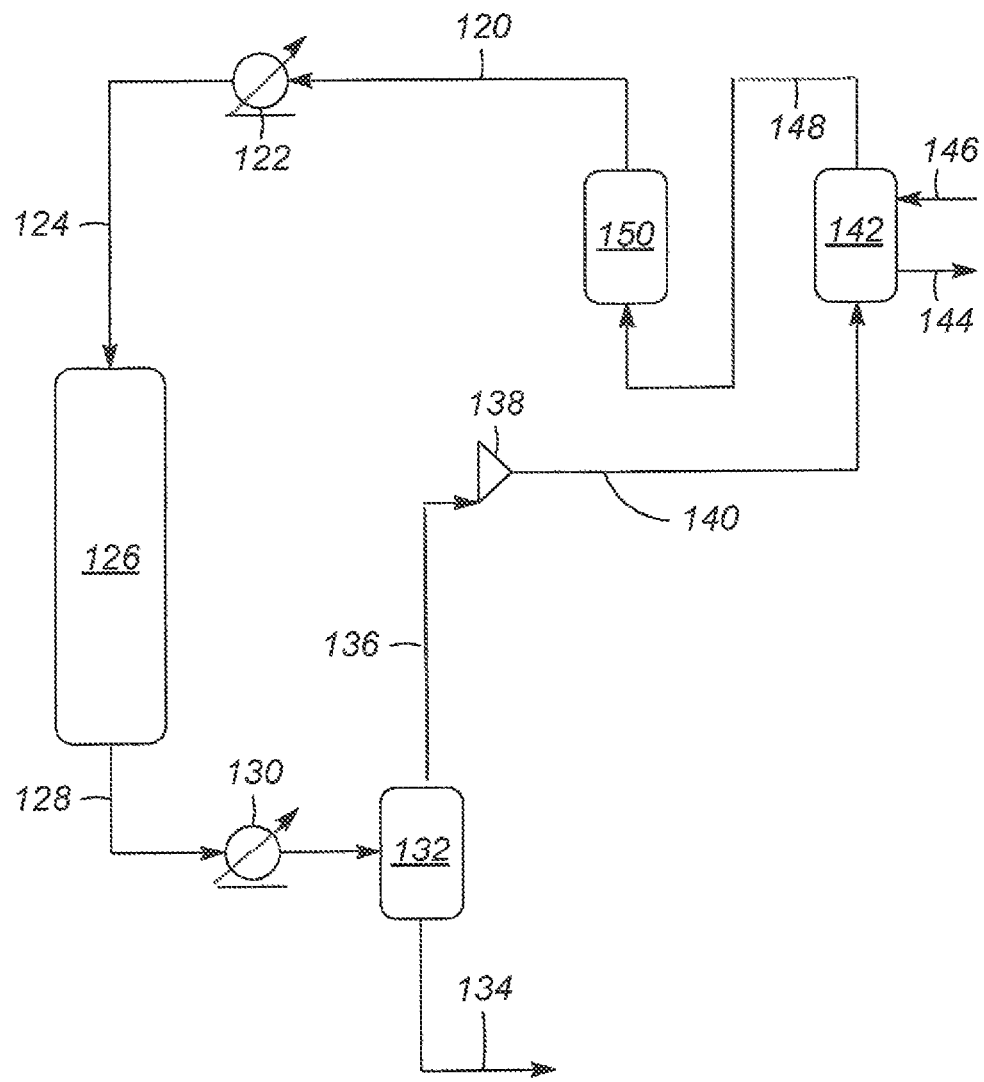
FIG. 5 shows an alternative purifying step in a regeneration configuration.

FIG. 5 shows a system to purify the vapor stream used in regenerating the adsorbent bed. A vapor stream 120 is heated by heater 122 to produce heated vapor stream 124 that passes through adsorbent bed 126. A stream 128 containing impurities is cooled by cooler 130 and then in separator 132 is separated into liquid 134 and vapor stream 136 which is compressed by compressor 138. Compressed stream 140 is passed through lean oil wash 142 with lean oil entering at 146 and waste exiting at 144. Stream 148 then passes through a dehydration bed 150 to produce vapor stream 120.

Figure 6:
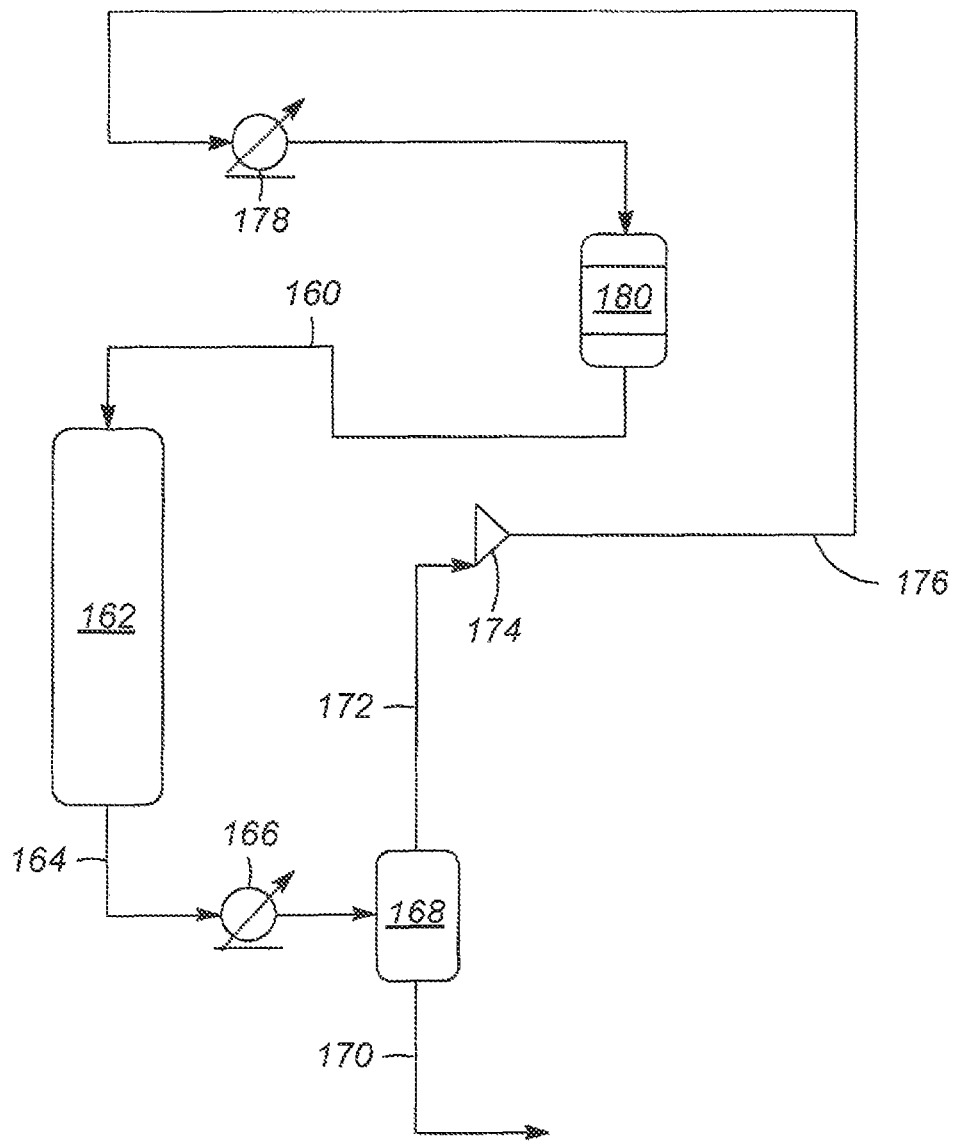
FIG. 6 shows a regeneration step for an adsorbent bed.

FIG. 6 shows a regeneration system for two adsorbent beds. Hot vapor stream 160 is sent through adsorbent bed 162 with contaminated stream 164 cooled by cooler 166 and then passing through separator 168 to produce a liquid stream 170 and a vapor stream 172 that is compressed by compressor 174 with compressed vapor stream 176 being heated by heater 178 to form stream 275 and then passing through a dehydration bed 180 where water is removed from the bed to produce hot vapor stream 160.

Figure 7:
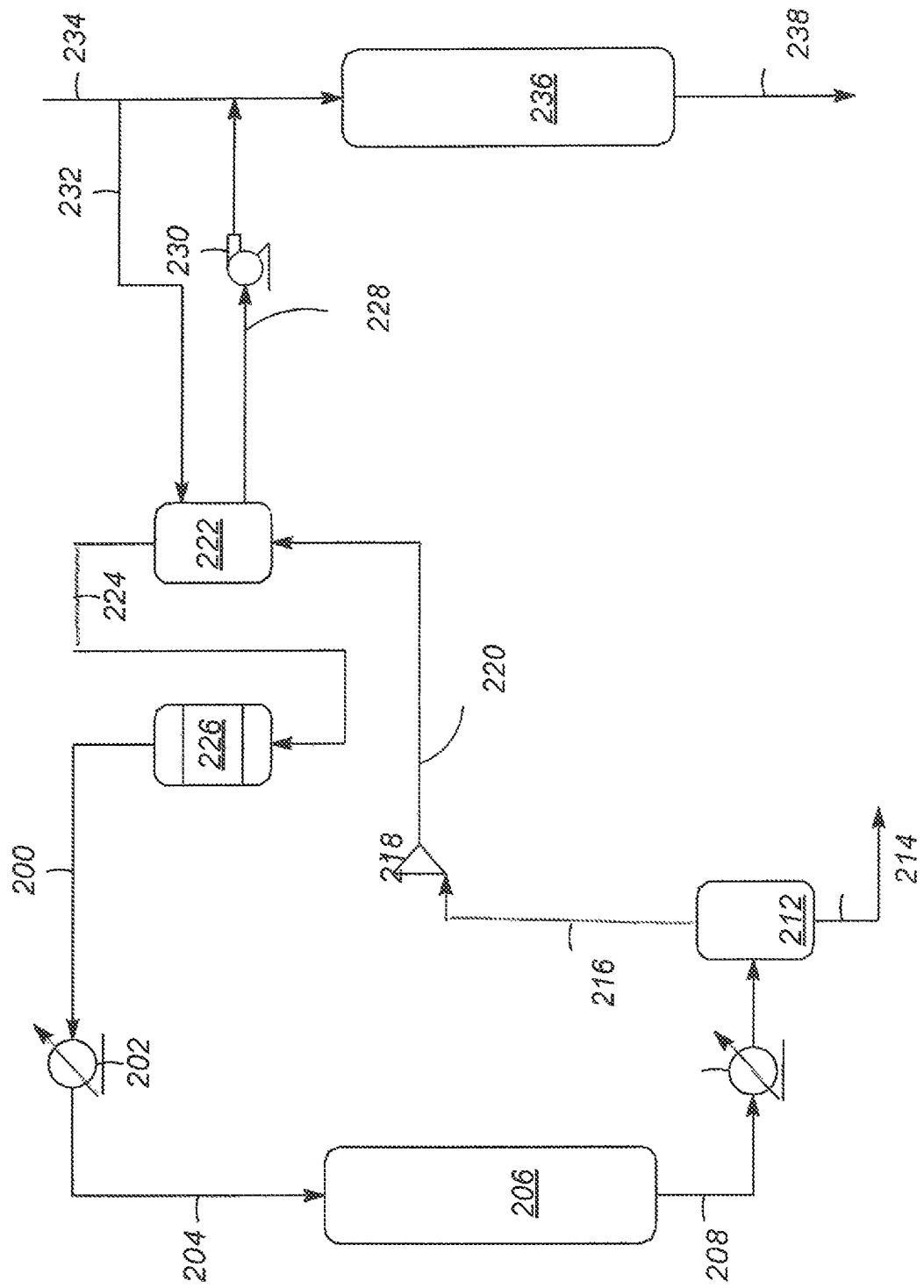
FIG. 7 shows a configuration that incorporates a lean oil wash.

FIG. 7 shows a lean oil wash being used to remove impurities from the vapor before it passes through the adsorbent bed. In this embodiment of the invention, a vapor stream 200 is heated by heater 202 with heated vapor stream passing through adsorbent bed 206 to remove impurities. Contaminated vapor 208 is cooled by cooler 210 and separator 212 results in liquid stream 214 and vapor stream 216 which is then compressed by compressor 218. Compressed vapor stream 220 is sent to lean oil wash 222 to remove impurities with a purified stream 224 sent to dehydration unit 226 to produce the vapor stream 200. Also shown are light naphtha 232 that is used in the lean oil wash 222 and that is passed through pump 230 to a feed line 234 for feed light naphtha, Fed light naphtha is subsequently treated in unit 236 used to produce product light naphtha 238.

Figure 8A:
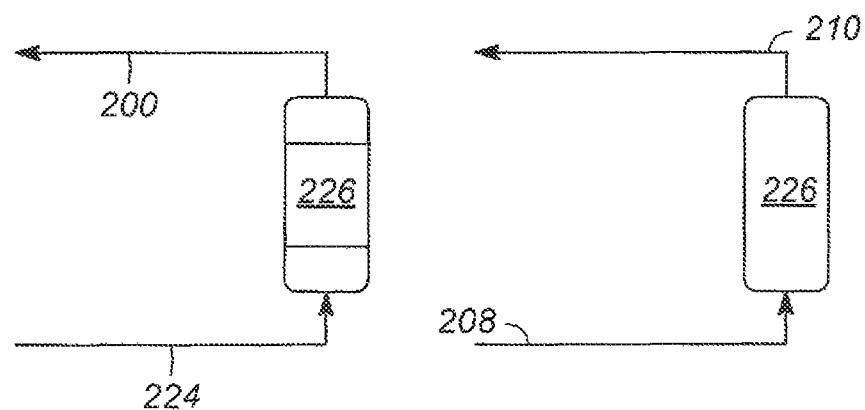
FIG. 8A shows the use of a nonregenerable guard bed to reduce the contaminants in the regenerating stream for the adsorbent bed.
Figure 8B:
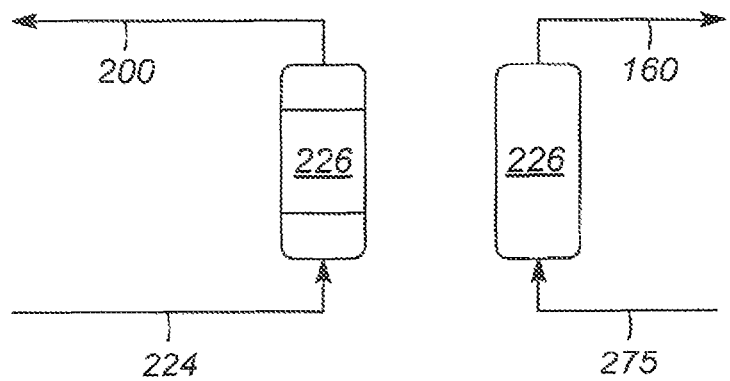
FIG. 8B shows a TSA regenerable guard bed to remove the contaminants in the regenerating stream for the adsorbent bed.
Figure 8C:
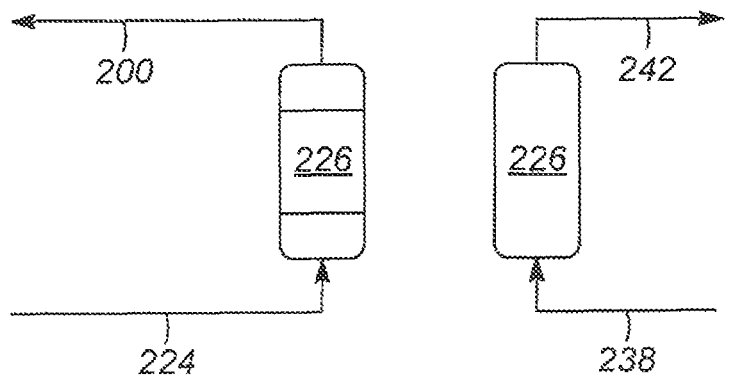
FIG. 8C shows a PSA regenerable guard bed to remove the contaminants in the regenerating stream for the adsorbent bed.
Figure 9A:
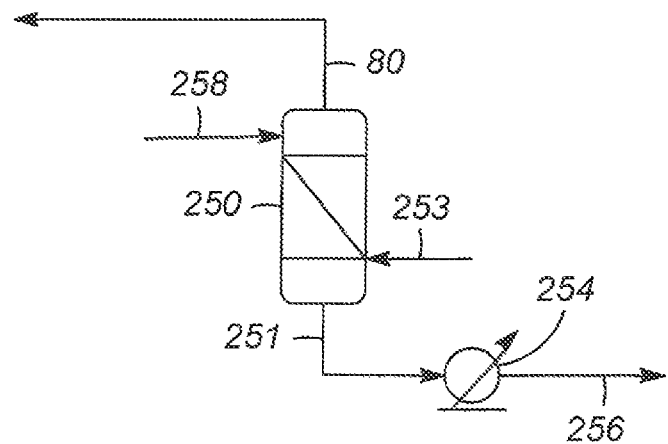
FIG. 9A shows addition of a heavies fractionation column to remove contaminants in the regenerating stream for the adsorbent bed.
Figure 9B:
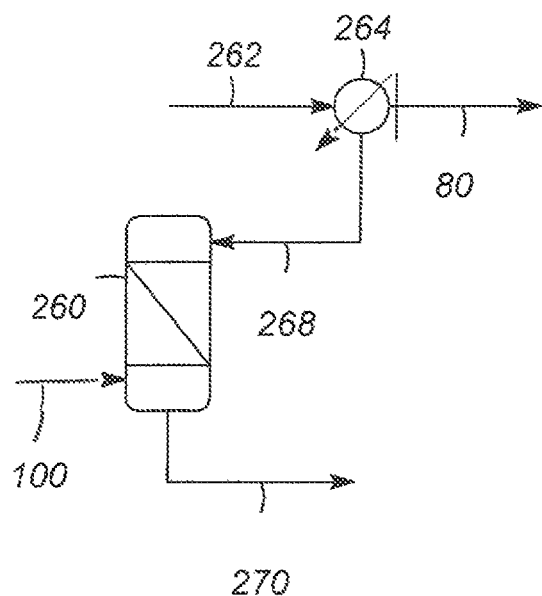
FIG. 9B shows addition of a light fractionation column to remove contaminants in the regenerating stream for the adsorbent bed.

FIG. 8 show several alternative methods to regenerate the adsorbent bed (such as the adsorbent bed 226 in FIG. 7). The adsorbent bed may be regenerated either in a TSA, PSA or combination of both (TPSA). Different guard bed regeneration are shown in FIGS. 8A, 8B and 8C. FIG. 8A shows purifying a vapor stream 224 that passes through guard bed 226 to produce a purified vapor stream 200. Also shown is the vapor stream 208 where the bed is in regenerating mode passing through a bed 226 with vapor stream 210 when the guard bed is being regenerated. In FIG. 8B, the guard bed is a temperature swing adsorption bed shown in purifying mode with stream 224 passing through TSA bed 226 to produce purified stream 200. The TSA bed 226 is shown in regeneration mode with a hot fluid 275 and a fluid 160 containing contaminants shown. FIG. 8C shows a PSA bed in purifying mode with vapor stream 224 to bed 226 and purified vapor stream 200 as well as a PSA bed in regeneration mode with a low pressure sweep gas 238 passing through PSA bed 240 and sweep gas 242 exiting containing contaminants removed from PSA bed 226. It is noted that bed 226 may represent one or multiple beds in different stages of operation FIG. 9 show several alternative methods to scrub impurities from the vapor (such as the purifier 102 in FIG. 4). The scrubber may be a guard bed or a fractionator. FIG. 9A shows a heavies fractionation unit to treat a feed liquid to produce clean vapor 252. A feed vapor 100 is first condensed in cooler 252 to form liquid stream 258 and then passes through fractionation unit 250 with liquid 251 exiting, passing through reboiler 254, waste liquid 256 exiting and a portion 253 returning to fractionation unit 250. A purge gas stream 80 is produced as a vapor product FIG. 9B shows a light fractionation unit in which a feed vapor 100 enters light fractionation unit 260 with clean liquid 270 produced. A vapor stream 262 is cooled by heat exchanger 264 with a portion 268 returning to fractionation unit 260 and a purge gas stream 80 exiting.

Figure 10:
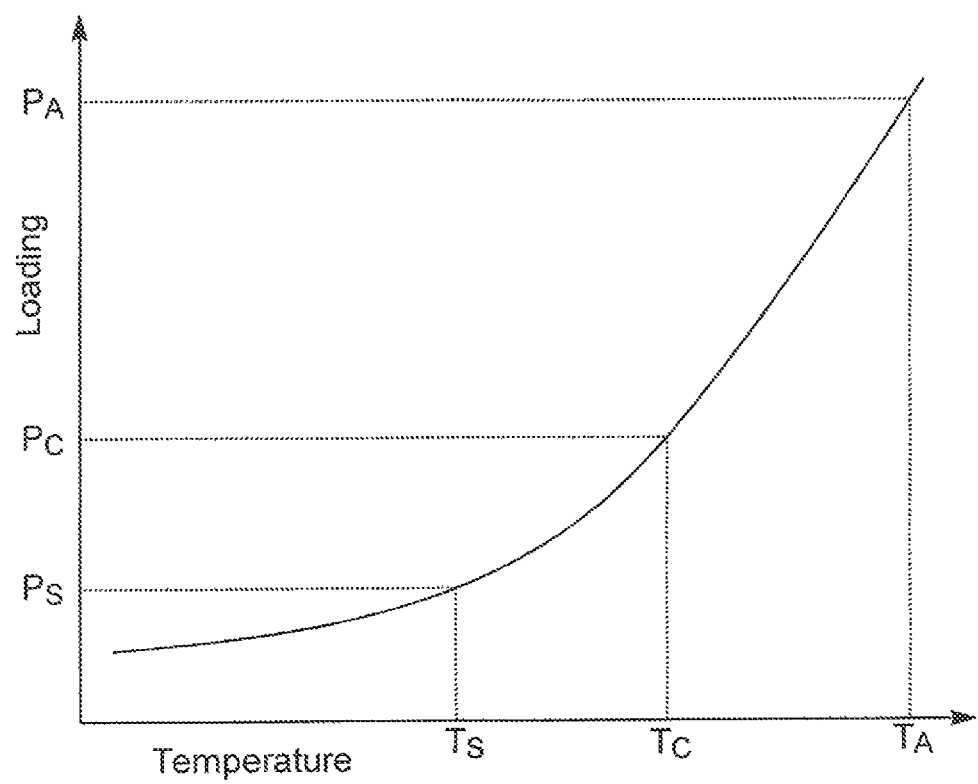
FIG. 10 shows a typical adsorbent plot for loading capacity of adsorbent increases as the temperature increases.

When condensing a stream, the mixture will typically follow a condensation curve as shown in FIG. 10. The hot purge gas enters the cooler at $T_A$ and a loading of the contaminants of $P_A$. At the end of the cooler the temperature has been reduced to $T_C$ and as a result the contaminants are now present at $P_C$. Therefore, the amount of contaminants which have been removed is $P_A-P_C$. In order to achieve the necessary bed cleanliness it has been defined that a purge gas purity of $P_S$ is required, and this has driven companies to either use chillers to drive down the condensation to $T_S$, or look at ways in which the loading $P_C-P_S$ can be removed after the cooler/separator. The erroneous assumption has been that during the regeneration process, a loading of $P_S$ in the purge gas is always required. It is not required and at the early stages or regeneration, it is prudent to not have it at $P_S$.

The loading $P_S$ in the purge gas has been specified so that upon completion of the regeneration step, the bed has sufficiently been clean so that it is able to achieve the purity of the clean process fluid. While the adsorbent is hot, little if any contaminants remain in the pores of the adsorbent. It is only during the cooling phase (step 4 above) that the contaminants which are present in the purge. While the adsorbent cools it develops a greater affinity for the contaminants and will remove them from the purge gas. If the contaminant levels are too high in the bed, then when the contaminated process fluid is passed through it, the purity specification will not be achieved.

However, during the heating process, this is not a problem. As $P_A \gg P_C$ the hot purge gas will remove the contaminants from the bed. The idea therefore is only at the end of thermal soak stage, to reduce the loading to $P_S$ and do so in a way that does not impact CAPEX and OPEX. In FIG. 3, the regen system operates as a regular TSA and the loading in the hot regen gas is $P_C$. Towards the end of the thermal soak step, the waste purge gas exiting the compressor (or cooler) is passed through a scrubber which brings it down to a loading of $P_S$. Because it is a closed loop, the transition from $P_C$ to $P_S$ does not need to be instantaneous or once-through and over a series of many passes through the scrubber, a loading of $P_S$ a can be achieved. As long at the loading in the purge gas has been reduced to $P_S$ at the beginning (or even during the early stages of the cooling step) the bed will be able to achieve the clean process fluid specifications.

This scrubber can take many forms. They can utilize adsorption, fractionation or many other approaches to reduce the loading of the contaminants in the regen stream. A benefit over the equipment used in U.S. Pat. No. 4,971,606 is that because the transition from $P_C$ to $P_S$ does not need to be achieved in a single pass, the scrubbers can be optimized to reduce CAPEX. Further, more than one scrubber can be used and a process developed which does not necessitate the generation of a second waste stream (as with U.S. Pat. No. 4,971,606)

In FIG. 5, two different contaminants need to be removed. The first is can be removed using a lean oil wash and the second (herein water) is removed in a second TSA bed (DeHy). During the purge purification step, the waste purge gas is passed sequentially through the two units and over about 10 cycles, the loading of contaminants in the purge gas is reduced to $P_S$. In FIG. 6, the DeHy bed is regenerated during the heat of the bed or thermal soak stages of the regeneration cycle, and the water which was adsorbed onto the bed will leave the system in the separator liquid. In FIG. 7, the contaminants which were removed in the lean oil wash column, are sent to the feed to an on-stream bed and then removed in the separator liquid at during that bed's regeneration step. The result of this integration is that a closed loop regen system can be employed using an ambient temperature cooler but achieve loading levels only achievable if substantially lower temperatures were employed.

There are two further benefits of this approach over U.S. Pat. No. 4,971,606. In a long-cycle TSA, the amount contaminants removed during the scrubber step are substantially less. In an example, where the separator removes 10 times the amount of contaminant than the scrubber $[(P_A-P_C)=10\times(P_C-P_S)]$ and the amount of time it takes to run the scrubber in this arrangement in only $\frac{1}{10}^{th}$ of the time of the heating of the bed and the thermal soak stages ($T_{HS}$) then the amount of contaminants removed is substantially less.

Scrubber on stream continuously:

$$\text{Mass removed by the cooler/separator}=(P_A-P_C)\times T_{HS}$$

$$\text{Mass removed by the scrubber}=(P_C-P_S)\times T_{HS}=0.1\times(P_A-P_C)\times T_{HS}$$

Scrubber on only once no more liquid flows from the separator.

$$\text{Mass removed by the scrubber}=\frac{1}{2}\times(P_C-P_S)\times 0.1\times T_{HS}=0.005\times(P_A-P_C)\times T_{HS}$$

Therefore, the only 1/20 if the contaminants are removed by the scrubber in comparison to the approach taken by U.S. Pat. No. 4,971,606. The reason for this is that if the scrubber was run continuously, the bed would be continuously replacing the loading removed by the scrubber ($P_C-P_S$). However, as has been discussed the lower loading to the bed during this stage provides very little benefit as the gas is at a high temperature and the adsorbent has very little affinity for the contaminants when hot. Once the bed has reached the end of the thermal soak cycle, the separator no longer removes any liquid. Therefore, bringing the scrubber on at this stage would result in the loading of the feed to the scrubber dropping from $P_C$ to $P_S$ over a period of time and approximately half the mass of contaminate would need to be removed than if it remained constant. This reduction opens up the potential to use a chemisorbant for the removal of the contaminant during the purification step or smaller, cheaper equipment.

The second benefit can be found during the heating step. During the heating of the bed step, hot purge gas enters the bed and cooler gas leaves. This is because the majority of the specific heat ($C_P$) of the gas is transferred to the adsorbent. Therefore, in order to heat the bed as rapidly as possible it is key to ensure that no heat is wasted during this step. As a result, the beds are frequently insulated. However, in running the scrubber continuously, a parasitic heat load is introduced. As the gas passes down through the bed, it is cooled and for a large fraction of the time will exit the bed at or near to ambient conditions. During this stage, contaminants will condense onto the adsorbent as the cool purge stream will leave the bed as a two-phase fluid. The gas phase would be loaded at $P_C$. If the hot purge gas was introduced into the bed at $P_C$ then during this phase or the bed heating the specific heat of the feed gas would be fully consumed in the heating of the adsorbent as any heat which had been used to vaporize the contaminant would be recovered by the lower part of the bed when the contaminant is condensed.

However, if the hot purge gas was introduced into the bed at $P_S$ and left at $P_C$ then the latent heat which was necessary to saturate the gas up to $P_C$ would not have been available to heat the adsorbent. In calculations, it is estimated that with a long 6-hour cycle necessary to heat the bed, this full utilization of the heat could potentially shorten the heating time by almost 30 minutes.

The idea is therefore to run a closed loop regeneration cycle for a TSA and then only once the separator no longer discharges liquid, bring the scrubber on-stream in order to reduce the loading from $P_C$ to $P_S$. In doing so, in comparison to a solution like found in U.S. Pat. No. 4,971,606, a lower cost scrubber could be utilized and a smaller fraction of the contaminant needs to be removed by the scrubber.

In another embodiment of the invention, the traditional solution would be to use the PSA hydrogen in an open cycle arrangement. In a Naphtha CS2 case, 5,350 kg/h of PSA hydrogen would be needed, and after the condenser, it would be saturated with naphtha, around 2.5 wt %. This would continue until there is insufficient naphtha in the macropores of the adsorbent to raise the dew-point of the PSA hydrogen to the point that the condenser is able to crease a liquid. It is calculated that for approximately 6 hr a flow-rate of 134 kg/h of naphtha, totaling 770 kg will be delivered into the downstream processes as a result of the saturation of the PSA hydrogen. If a closed loop cycle was used, then while the naphtha is not sent into any downstream processes, the contaminates such as CS2 which were in the micropores would remain at elevated levels and the adsorbent would not be sufficiently regenerated. A possible solution would be to bleed in 10% of PSA hydrogen into a closed loop cycle and then send only 10% into the downstream processes. This would reduce the flow to 13.4 kg/h and a total of 111 kg. Still a potential issue. The invention operates the LTSA regeneration in a closed cycle for the first part of the process and then once the dew-point limit is reached, a small bleed of PSA-hydrogen is introduced (2-6% of flow). This bleed is slowly increased such that the peak naphtha flow does not increase. Once the closed loop has almost been completely purged, the full flow of the PSA hydrogen is allowed to remove the last traces of naphtha and $CS_2$. The resulting analysis suggests that a total of 9 kg of naphtha would be sent into downstream processes at a peak flow-rate of 7 kg/h. In addition, given a longer cycle time, the peak could be reduced to less than 5 kg/h.

The invention is shown in the following Figures. FIG. 1 shows an open loop regeneration scheme in which a purge gas stream 2 is sent through heater 4 with heated purge gas stream 6 entering the top of adsorbent bed 8 to remove impurities and producing a contaminated gas stream 10 that is cooled by cooler 12 and then in separator 14, divided into a liquid stream 18 and a waste purge gas stream 16. Operating in open loop mode there is an increased need for purge gas when it is not recirculated as in closed loop mode shown in FIG. 2 where a compressed purge gas stream 20 is heated by heater 22 with heated purge gas stream 24 sent through adsorbent bed 26 to remove impurities and contaminated stream 28 being cooled by cooler 30 and then separated into liquid stream 34 containing the majority of the impurities removed from adsorbent bed 26 and vapor stream 36 in separator 32. Vapor stream 36 is compressed by compressor 38 to produce purge gas 20.

A third mode of operation is shown in FIG. 3 which shows a regeneration scheme in semi-closed mode. A feed 40 is combined into vapor stream 42 that is heated by heater 42 to heated gas stream 46. Impurities are removed from adsorbent bed 48 with contaminated stream 50 being cooled in cooler 52 and then separated in separator 54 into a liquid stream 56 and a vapor stream 58 to be compressed by compressor 60. A portion of compressed stream 61 is purged and the remainder 64 of the stream is combined with feed 40.

FIG. 4 shows a mode of operation with purification of the stream that is used in regeneration of the adsorbent bed. A gas stream 80 that has been purified in scrubber 102 is heated by heater 82 and then the heated gas stream 84 is sent through adsorbent bed 86. A contaminated gas stream 88 that contains impurities from adsorbent bed 86 is cooled by cooler 90 and then sent to separator 92 with a liquid stream 94 and a vapor stream 96 being the products of separator 92. Vapor stream 96 is then compressed by compressor 98.

FIG. 5 shows a purifying mode for the system and FIG. 6 has actual regeneration of the adsorbent bed. In FIG. 5, a gas stream 120 is heated by heater 122 with heated gas stream 124 passing through adsorbent bed 126 with contaminated stream 128 going to cooler 130 to separator 132. A liquid stream 134 and a vapor stream 136 exit separator 132 with vapor stream 136 passing through compressor 138 to compressed stream 140 and a lean oil wash 146 with waste LN 144 exiting and wash LN 146 entering the lean oil wash. A clean stream 146 is then sent to be dehydrated in vessel 150.

FIG. 6 shows an embodiment of the invention in regeneration mode. A gas stream 160 is sent to an adsorbent bed 162 to remove impurities from the adsorbent. A contaminated gas stream 164 then is cooled by cooler 166 and then in separator 168 a liquid stream 170 and a vapor stream 172 are produced with vapor stream 172 compressed by compressor 174. Compressed stream 174 is heated by heater 178 and dehydrated by bed 180 to produce gas stream 160.

Any of the above conduits, unit devices, scaffolding, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

SPECIFIC EMBODIMENTS

While the following is described in conjunction with specific embodiments, it will be understood that this description is intended to illustrate and not limit the scope of the preceding description and the appended claims.

A first embodiment of the invention is a process for regenerating a temperature swing adsorption unit comprising sending a heated purge gas stream through an adsorption bed to remove impurities from the adsorption bed and producing a contaminated stream; sending the contaminated stream to a separator to produce a liquid stream and a vapor stream; returning the vapor stream as at least a portion of the heated purge stream until the vapor stream comprises above a predetermined level of impurities; and purging a portion of the vapor stream until the heated purge stream has a level of impurities below a second predetermined level. An embodiment of the invention is one, any or all of prior embodiments in this paragraph up through the first embodiment in this paragraph further comprising cooling the contaminated stream. An embodiment of the invention is one, any or all of prior embodiments in this paragraph up through the first embodiment in this paragraph further comprising determining a purity of the heated purge gas, comparing the purity to a predetermined value and purging at least a portion of the heated purge gas when the predetermined value is exceeded. An embodiment of the invention is one, any or all of prior embodiments in this paragraph up through the first embodiment in this paragraph further comprising scrubbing a vapor stream prior to heating the vapor stream to become the heated purge gas stream. An embodiment of the invention is one, any or all of prior embodiments in this paragraph up through the first embodiment in this paragraph wherein the scrubbing is done by a scrubber comprising a guard bed or a fractionator. An embodiment of the invention is one, any or all of prior embodiments in this paragraph up through the first embodiment in this paragraph wherein the guard bed is a pressure swing adsorption bed or a temperature swing adsorption bed. An embodiment of the invention is one, any or all of prior embodiments in this paragraph up through the first embodiment in this paragraph wherein the process uses an open loop, closed loop or semi-closed loop. An embodiment of the invention is one, any or all of prior embodiments in this paragraph up through the first embodiment in this paragraph wherein the scrubber comprises a guard bed and a lean oil wash unit. An embodiment of the invention is one, any or all of prior embodiments in this paragraph up through the first embodiment in this paragraph further comprising at least one of sensing at least one parameter of the process and generating a signal from the sensing; sensing at least one parameter of the process and generating data from the sensing; generating and transmitting a signal; generating and transmitting data. An embodiment of the invention is one, any or all of prior embodiments in this paragraph up through the first embodiment in this paragraph wherein the signal results in a scrubbing of the purge gas stream.

The invention claimed is:

1. A process for regenerating a temperature swing adsorption unit comprising:
    sending a heated purge gas stream through an adsorption bed to remove impurities from said adsorption bed and producing a contaminated stream;
    sending said contaminated stream to a separator to produce a liquid stream and a vapor stream;
    returning said vapor stream as at least a portion of said heated purge stream until said vapor stream comprises below a predetermined level of impurities; and
    then further reducing the level of impurities of a portion of said vapor stream until the heated purge stream has a level of impurities below a second predetermined level,
    wherein said vapor stream is scrubbed of impurities prior to heating said vapor stream to become said heated purge gas stream.

2. The process of claim 1 further comprising cooling said contaminated stream.

3. The process of claim 1 further comprising determining a purity of said heated purge gas, comparing said purity to a predetermined value and purging at least a portion of said heated purge gas when said predetermined value is exceeded.

4. The process of claim 1 wherein said scrubbing is done by a scrubber comprising a guard bed or a fractionator.

5. The process of claim 4 wherein said guard bed is a pressure swing adsorption bed or a temperature swing adsorption bed.

6. The process of claim 1 wherein said process uses an open loop, closed loop or semiclosed loop.

7. The process of claim 1 wherein said scrubber comprises a guard bed and a lean oil wash unit.

8. The process of claim 1 further comprising at least one of:
    sensing at least one parameter of the process and generating a signal from the sensing;
    sensing at least one parameter of the process and generating data from the sensing;
    generating and transmitting a signal;
    generating and transmitting data.

9. The process of claim 8 wherein the signal results in a scrubbing of said purge gas stream.

* * * * *